(12) United States Patent
Legaspi

(10) Patent No.: US 6,196,510 B1
(45) Date of Patent: Mar. 6, 2001

(54) QUICK RELEASE BRACKET FOR SHOWCASING COMPACT DISK CASES

(76) Inventor: Ferdinand Legaspi, 46 Wood Ranch Cir., Danville, CA (US) 94506

( * ) Notice: Subject to any disclaimer, the term of this patent is extended or adjusted under 35 U.S.C. 154(b) by 0 days.

(21) Appl. No.: 09/369,738

(22) Filed: Aug. 6, 1999

Related U.S. Application Data

(63) Continuation-in-part of application No. 09/167,183, filed on Oct. 6, 1998, now abandoned.

(51) Int. Cl.[7] .......................................... A47F 7/00
(52) U.S. Cl. ........................... 248/311.2; 211/40
(58) Field of Search ............ 248/311.2, 231.81; 211/40

(56) References Cited

U.S. PATENT DOCUMENTS

| | | | |
|---|---|---|---|
| 5,088,674 | * | 2/1992 | Prince ............................. 248/311.2 |
| 5,603,415 | * | 2/1997 | Balnis .................................. 211/40 |

* cited by examiner

Primary Examiner—Alvin Chin-Shue

(57) ABSTRACT

A bracket (10) is provided for supporting CD cases onto a planar mounting surface (400) so that the front of the case (190) is visible. The bracket (10) is comprised of a planar (60), which has a rigid portion (60), a flexible portion (90), a first side which faces the mounting surface (400), and a second side which faces away from the mounting surface (400). Four rigid arms (130, 140, 170, 180), are attached to the first side and are positioned to hold the case (190) when the case is engaged into the bracket. Two rigid base pieces (20, 30) function as offsetting means, to offset the bracket (10) from the mounting surface (400). Two tabs (150, 160) for holding the case (10) by two holes (260, 270) on the case (10) are attached to two (130, 140) of the arms. The remaining two arms (170, 180) do not have tabs, and one of these arms (170) is attached to the flexible portion (90) of the planar (60). Case insertion into the bracket and extraction from the bracket is made possible by the interaction of the offsetting means (20, 30), the flexible portion (90), and the arm (170) with no tabs. Both insertion and extraction do not require any forces pulling the bracket (10) away from the mounting surface (400). Instead, case insertion and extraction is executed by pushing an arm (170) elastically toward the mounting surface (400), eliminating the risk of inadvertently separating the bracket (10) from the mounting surface (400) or damaging the mounting surface. The bracket inflicts zero clamping forces on the case (190), eliminating the risk of damaging the case (190).

1 Claim, 4 Drawing Sheets

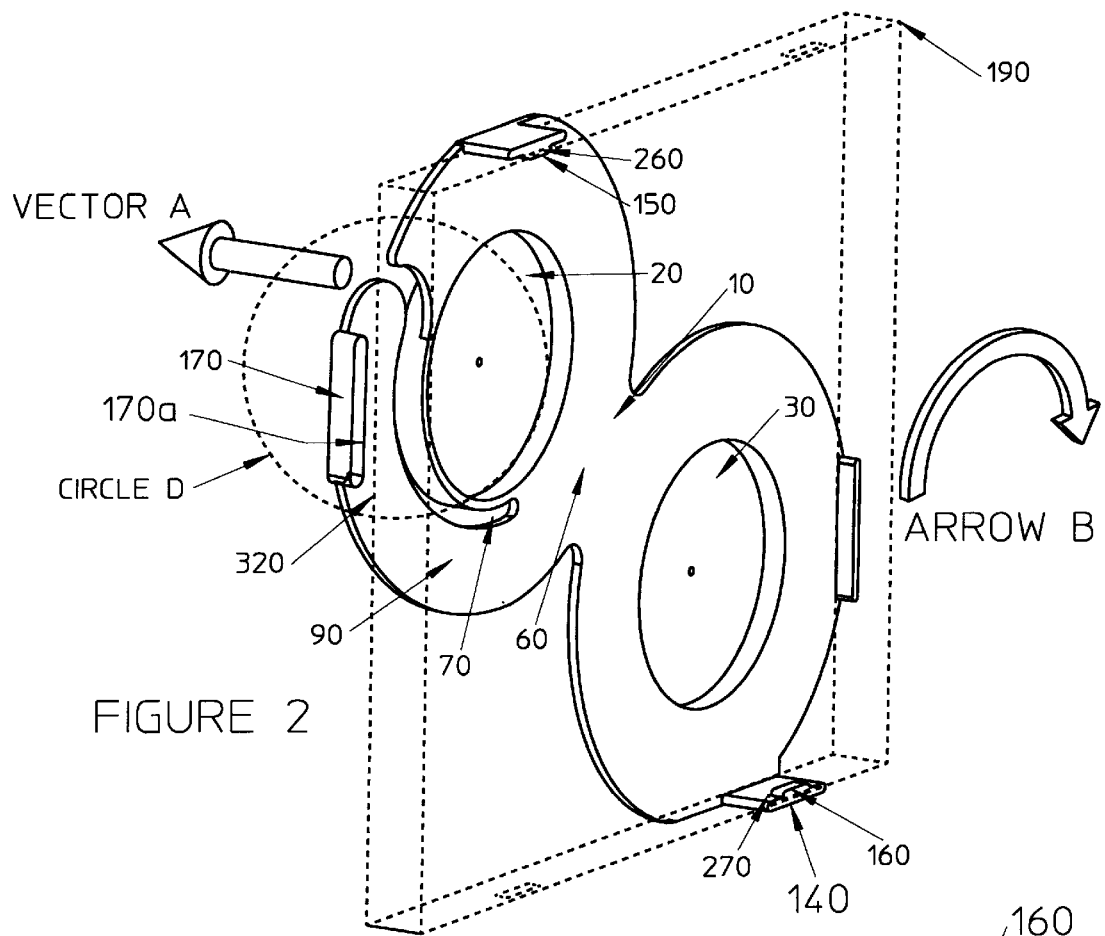
FIGURE 2
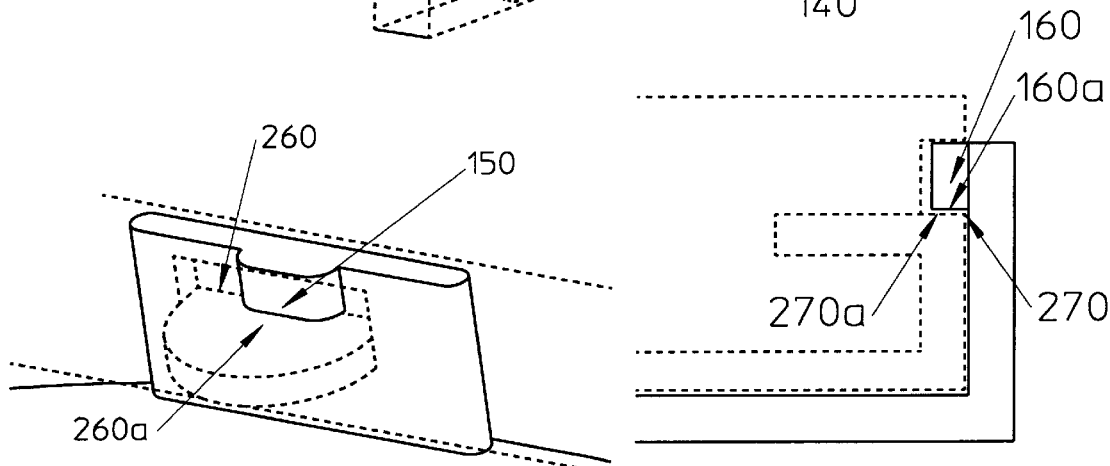
FIGURE 2A
FIGURE 2B

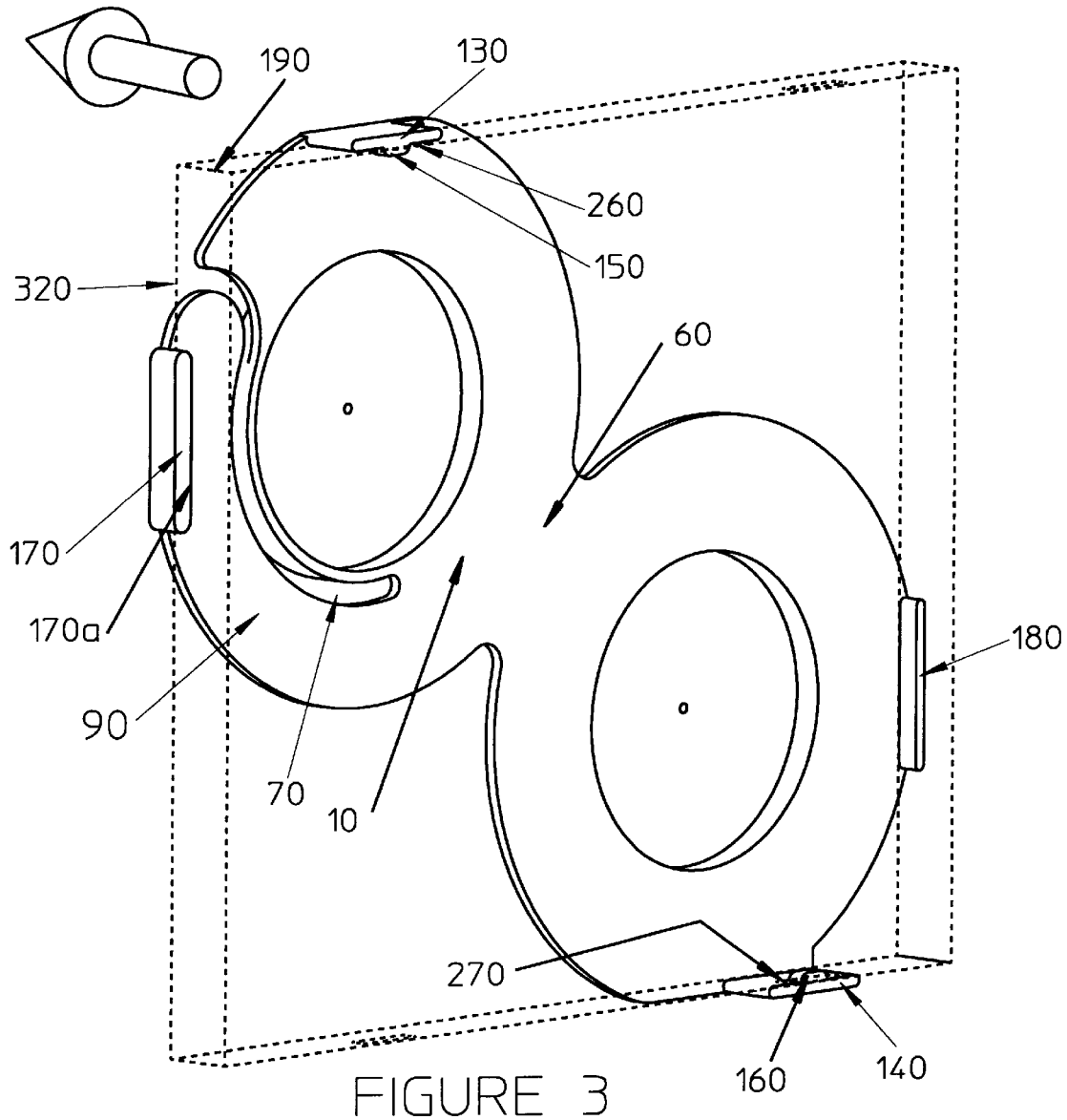

QUICK RELEASE BRACKET FOR SHOWCASING COMPACT DISK CASES

This is a CIP of U.S. Ser. No. 09/167,183, filed Oct. 6, 1998, abandoned.

BACKGROUND

1. Field of Invention

This invention relates to brackets, specifically to such brackets which are used for supporting Compact Disk cases commonly referred to in the music and video industry as Jewel Cases onto planar surfaces such as walls and ceilings for display of the cover art on the front of the CD case.

2. Description of the Prior Art

Prior to discussing the background and description of prior art, let us establish a geometrical convention for referring to the conventional 6 sided Compact Disk case. Let the side which displays the cover art be known as the "front side." The opposite side is therefore the "rear side." When the case is held in the normal orientation for viewing or reading the cover artwork we can now refer to the sides adjacent to the top, bottom, left, and right edges of the front side as the "top, bottom, left and right sides," respectively.

Conventional compact disk case storage devices are designed for storage of multiple compact disks. Multiple parallel adjacent slots are provided into which Compact Disks are inserted right side first, allowing only the left side to be visible. Jewel Case storage devices of the type described in the current paragraph suffer from the following disadvantages:

a) They do not provide a means of displaying the cover art on the front of the CD case.
   i) This is a feature that would be make it possible for a CD collection owner to showcase several of his/her favorite and/or most often used CD's cases, full or empty, on a planar surface such as a wall, with the front cover of each CD visible.
b) They do not provide a means for keeping empty CD cases in a specified, highly conspicuous place, with the front cover art visible, making it easier for the CD owner to find the empty case when needed.
   i) This would be a useful feature for preventing misplacement of the empty case(s) of one's favorite CD('s) because said empty case(s) is often left in an unspecified location while said favorite CD('s) may be left in the player for indefinite periods of time for convenience.

U.S. Pat. No. 5,088,674 describes a CD case wall mounting bracket designed for mounting a single CD case to a vertical mounting surface, allowing the user to open the CD case's cover 180 degrees without removing the case from the bracket. The claims and preferred embodiment of U.S. Pat. No. 5,088,674 do not mention any mechanism, feature, or means for readily extracting the CD case from the wall mounting bracket, implying that extractability of the case from the bracket was not an intended feature of said invention of U.S. Pat. No. 5,088,674. Therefore, said invention suffers from the following disadvantages:

a) It does not provide the user, once the case is engaged into the current bracket, access to the information or artwork visible on the rear side of the CD case.
   i) This would be a necessary feature if the CD owner needed information visible only on the rear side of the CD case.
   ii) The rear side of CD cases usually displays artwork and valuable information, such as a list showing the order in which songs appear on music CD's.

b) It does not provide the user with a means to readily extract a specified CD case from and/or engage the same CD case into a specified bracket of the present type.
   i) This feature would be necessary in order for the user to hold the CD case in hand, while the CD is playing, alternatively flip the case over from front side to rear side, and admire the artwork and/or read information on each said side.
   ii) This feature would also be necessary in order to examine said case as described in b), i) above, yet be able to readily and securely support the empty case on the planar mounting surface, in said bracket, whenever the case was not in use.
c) It does not provide the user with a means to readily re-arrange the CD cases displayed on a planar mounting surface by swapping CD cases between brackets mounted said surface and/or replace a CD case in an individual bracket.
   i) A significant example of where this feature would be needed is if a store owner was using such brackets to display 100 CD cases on a wall, in a top 100 pyramid pattern, and needed to swap the CD's between the brackets as frequently as the rankings of said CD's changed on an officially recognized music industry ranking list.
   ii) Another significant example of where this feature would be needed is if a user was decorating his/her bedroom or entertainment room wall with CD cases, and wanted to periodically re-arrange the CD cases into various groupings such as genre of music, basic color of cover art, release date, name of artist, etc.
d) It does not provide a means for mounting Jewel Cases to obliquely oriented planar surfaces an upside-down, ceiling oriented planar surfaces. The claims of U.S. Pat. No. 5,088,674 limit the invention's function to wall mounting.
   i) The bracket of U.S. Pat. No. 5,088,674 only clamps onto the rear side of the case, and will allow the front side, which is hinged to the rear side, to intermittently swing open due to the weight of the front side.

Of all the prior art, the invention of U.S. Pat. No. 5,088,674 most closely resembles the current invention, so the next few paragraphs will make obvious that the current invention is not covered by the claims of U.S. Pat. No. 5,088,674, as the current invention is significantly different from the former by form and fit. Comparison of the objects and advantages of the current patent below to the above disadvantages of U.S. Pat. No. 5,088,674 make obvious that the current design differs significantly from the former by function.

The main claim of U.S. Pat. No. 5,088,674 describes a bracket for supporting a compact disk case which has a hinged cover. For the bracket described herein, a hinged cover is inconsequential to the functionality of the bracket.

The main claim of U.S. Pat. No. 5,088,674 covers brackets which clamp onto compact disk cases at the two sides which define the case's width (the left to right dimension of the case when the case is held in the normal viewing position for reading the case's cover). The bracket described herein does not clamp onto either of those two sides, but rather on the two sides that define the case's height (the top to bottom dimension of the case when the case is held in the normal viewing position for reading the case's cover).

The main claim of U.S. Pat. No. 5,088,674 covers only brackets that have arms, clearance between which being approximately the same as the case width, the end of each arm having lips extending towards each other. The claims herein do not interfere with those of U.S. Pat. No. 5,088,674 as those herein cover only brackets having two arms distanced from each other by approximately the height of the case rather than the width of the case. The two arms of the preferred embodiment that do define the case's width have no tabs, lips, or means for clamping onto the CD case, as is covered by the claims of U.S. Pat. No. 5,088,674.

The main claim of U.S. Pat. No. 5,088,674 covers brackets whose distance between said lips and said base is slightly less than the thickness of the case at each said lip. In the bracket described herein, said distance would be inherently substantial rather than slight, as said means for clamping the case do so at the edges of the holes found on the top and bottom sides of the case, and the dimensions of said holes are substantial compared to the thickness of said sides, which defines the thickness of said case.

The first dependent claim of U.S. Pat. No. 5,088,674 also fails to cover the bracket described herein because the current bracket is designed such that the case does not move under any of the lips of the bracket, as is covered by the claims of U.S. Pat. No. 5,088,674. Because, as stated in the above paragraph, the clamping mechanism of the current bracket is designed to locate and clamp into holes found in the sides of the case, the arms of the bracket of the current invention are inherently shorter than the height of any of the sides of the bracket. This makes moving the CD case under any part of the bracket of the current invention impossible.

The second dependent claim of U.S. Pat. No. 5,088,674 fails to cover the current invention because it at least repeats all of the issues described in the above two paragraphs.

U.S. Pat. Nos. 3,537,365 and 4,940,147 describe Compact Disk wall racks that each hold multiple Compact Disks. The racks are mounted onto a wall in the same way a picture frame is mounted to a wall. The racks contain several tabs that locate and receive the Compact Disks in a matrix configuration. Racks of this type suffer from the following disadvantage:

a) They do not provide a means for the user to arrange his/her CD collection on a planar surface such as a wall in any configuration or pattern the user wishes.
      i) This would be a necessary feature if the user wished to change the pattern in which his/her was displayed, to any pattern such as floral, checkered, or top ten pyramid.

In summary, the prior art includes a variety of CD collection support or storage devices but none permit the ability to support several Jewel Cases on a planar mounting surface in any pattern desirable with the ability to easily extract the Jewel Case from the bracket.

OBJECTS AND ADVANTAGES

Accordingly, besides the objects and advantages of the CD case mounting bracket described in my above patent, several objects and advantages of the present invention are:

a) To provide a means of displaying the cover art on the front of the CD case while storing said case.
      i) This is a feature that would be make it possible for a CD collection owner to showcase several of his/her favorite and/or most often used CD's cases, full or empty, on a planar surface such as a wall, with the front cover of each CD visible.
   b) To provide a means for keeping empty CD cases in a specified, highly conspicuous place, with the front cover art visible, making it easier for the CD owner to find the empty case when needed.
      i) This would be a useful feature for preventing misplacement of the empty case(s) of one's favorite CD('s) because said empty case(s) is often left in an unspecified location while said favorite CD('s) may be left in the player for indefinite periods of time for convenience.
   c) To provide the user, once the case is engaged into the current bracket, access to the information or artwork visible on the rear side of the CD case.
      i) This would be a necessary feature if the CD owner needed information visible only on the rear side of the CD case.
      ii) The rear side of CD cases usually displays artwork and valuable information, such as a list showing the order in which songs appear on music CD's.
   d) To provide the user with a means to readily extract a specified CD case from and/or engage the same CD case into a specified bracket of the present type.
      i) This feature would be necessary in order for the user to hold the CD case in hand, while the CD is playing, alternatively flip the case over from front side to rear side, and admire the artwork and/or read information on each said side.
      ii) This feature would also be necessary in order to examine said case as described in b), i) above, yet be able to readily and securely support the empty case on the planar mounting surface, in said bracket, whenever the case was not in use.
   e) To provide the user with a means to readily re-arrange the CD cases displayed on a planar mounting surface by swapping CD cases between brackets mounted said surface and/or replace a CD case in an individual bracket.
      i) A significant example of where this feature would be needed is if a store owner was using such brackets to display 100 CD cases on a wall, in a top 100 pyramid pattern, and needed to swap the CD's between the brackets as frequently as the rankings of said CD's changed on an officially recognized music industry ranking list.
      ii) Another significant example of where this feature would be needed is if a user was decorating his/her bedroom or entertainment room wall with CD cases, and wanted to periodically re-arrange the CD cases into various groupings such as genre of music, basic color of cover art, release date, name of artist, etc.
   f) To provide a means for mounting Jewel Cases to obliquely oriented planar surfaces and upside-down, ceiling oriented planar surfaces. The claims of U.S. Pat. No. 5,088,674 limit the invention's function to wall mounting.
      i) The bracket of the current invention clamps onto the front side of the CD case, pulling with restoring force said front side towards the mounting surface, thereby preventing the case from falling and/or sliding out of the bracket as well as the front cover from intermittently swinging open due to the weight of the front cover.
   g) To provide a means for the user to arrange his/her CD collection on a planar surface such as a wall in any configuration or pattern the user wishes.
      i) This would be a necessary feature if the user wished to change the pattern in which his/her was displayed, to any pattern such as floral, checkered, or top ten pyramid.
   h) To provide a means, for mounting CD cases on a planar surface, that is aesthetically pleasing empty or full, with or without a CD case engaged into it.

i) For example, the shape of the preferred embodiment is designed to be aesthetically pleasing even when viewed empty, without a CD case engaged into it.

ii) When a CD case is engaged into said bracket, the bracket is inconspicuous.

SUMMARY OF THE INVENTION

In accordance with the present invention a bracket for mounting a CD case onto a planar surface comprises a rigid base for attachment to the surface, said base attached to a planar member which has a stationary part and a moving part from which arms extend perpendicularly and have tabs which extend perpendicularly and clamp into holes commonly found in the sides of the front cover of the CD case, said moving parts making it possible to readily extract the CD case from the bracket without removing the bracket from the mounting surface.

DESCRIPTION OF THE DRAWING

FIG. 2 is a perspective drawing of the bracket and case, with the case in engaged position, but with the arm of the bracket displaced toward the mounting surface. Therefore, in this position, the case is not securely held by the bracket. Here, the CD case, which is in front of the bracket is shown in phantom.

FIG. 2A is a fragmentary perspective view of the bracket, showing a zoomed view of a tab. In phantom is a perspective view of a portion of the case, showing a hole and a front facing surface held by the tab. In FIG. 2A a perspective view of an extruded semi circle tab is shown. Said semi circle tab is not shown in FIGS. 1, 2, 3, 4, and 5 for clarity, but is included in FIG. 2A to illustrate the function of a tab of the bracket.

FIG. 2B is a side view of the tab holding an edge and a front facing surface portion of the case. In phantom view is a section view of the case, where the cutting plane for the section view cuts through the center of a rectangular hole of the case. In FIG. 2B a section view of an extruded semi circle tab is shown. Said semi circle tab is not shown in FIGS. 1, 2, 3, 4, and 5 for clarity, but is included in FIG. 2B to illustrate the function of a tab of the bracket.

FIG. 3 is a perspective drawing of the bracket and case with the case fully engaged.

DETAILED DESCRIPTION OF THE PREFERRED EMBODIMENT

Prior to discussing the drawings of the preferred embodiment, let us establish a geometrical convention for referring to the conventional 6 sided Compact Disk case, which is not the object of this patent, but for which a geometrical convention for naming its sides and edges is necessary for understanding the said detailed description. Let the side which displays the cover art be known as the "front side." The opposite side is therefore the "rear side." When the case is held in the normal orientation for viewing or reading the cover artwork we can now refer to the sides adjacent to the top, bottom, left, and right edges of the front side as the "top, bottom, left and right sides," respectively.

Figure 1:
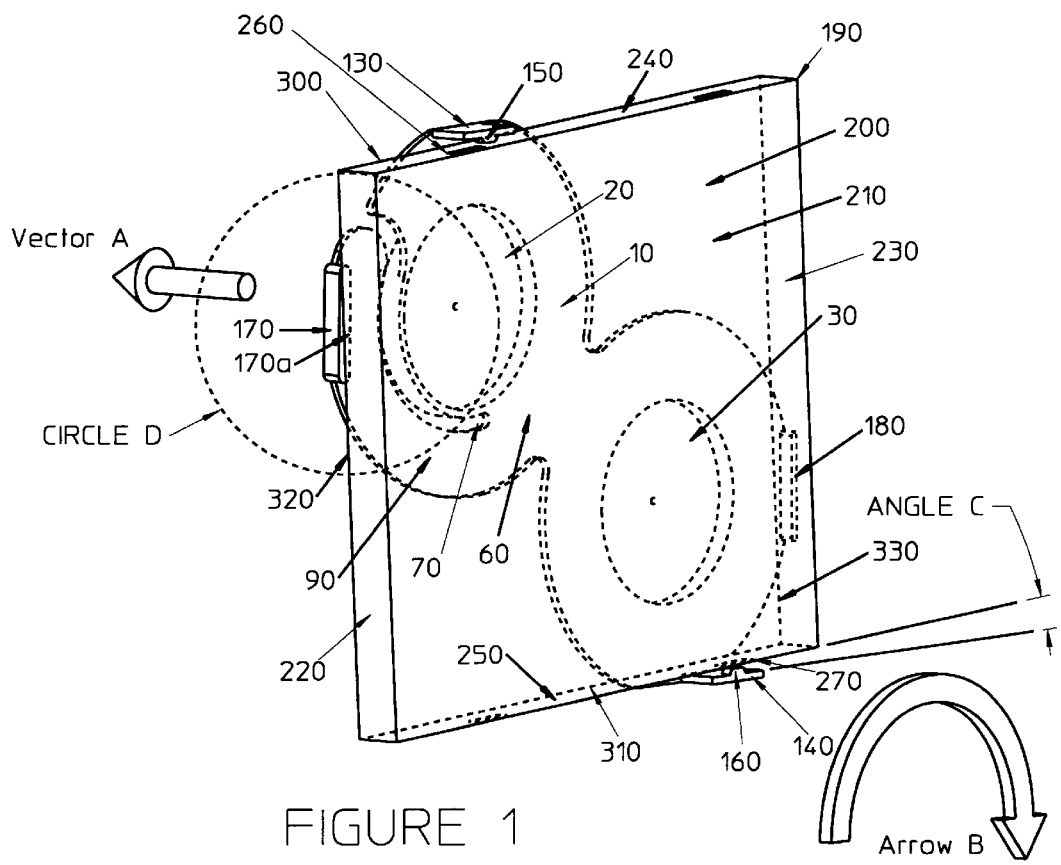
FIG. 1 is a perspective drawing of the bracket with an arm of the bracket being pushed toward the mounting surface. Dashed lines show the portions of the bracket behind the CD case.

FIG. 1 shows a CD case 190 and a bracket 10 in their relative positions immediately prior to full engagement of the CD case 190 in the bracket 10. In FIG. 1, the CD case 190 is shown to be in front of the bracket 10, which is in front of a planar mounting surface. For simplicity, the planar mounting surface is not shown in FIGS. 1, 2, 3, and 4. The mounting surface is shown in FIG. 5.

See FIG. 1. The bracket comprises two circular rigid base pieces 20 and 30, a planar 60 with a cutout 70, first and second arms 130, 140, which each have tabs 150, 160, for holding the CD Case, and third and fourth arms 170, 180, which have no tabs or protrusions.

See the curved cutout 70. To the left of the cutout 70 is a portion 90 which curves generally toward the top side 240 of the CD case and is defined on its right side by the entirety of the cutout 70. Portion 90 of the planar 60 is the only flexible portion of the planar 60, and portion 90 is hereafter known as the flexible cantilever portion of the planar 60. The rest of the planar 60 is rigid and not movable, even during insertion or extraction of the CD case 190 into and from the bracket 10.

Arms 130 and 140 are rigidly attached and contiguous to said remaining portion of the planar 60 which is rigid and rigidly attached to the rigid base pieces 20 and 30. Arms 130 and 140 have rigid tabs 150 and 160 and are adapted as rigid stops to hold and locate the CD case 190 in the bracket 10.

OPERATION—FIGS. 1, 2, 3, 4

Prior to discussing the operation of the current invention, let us establish a geometrical convention for referring to the conventional 6 sided Compact Disk case. See FIG. 1. Let the side which displays the cover art be known as the "front side" 200. The opposite side is therefore the "rear side" 210. When the case is held in the normal orientation for viewing or reading the cover artwork we can now refer to the sides adjacent to the top, bottom, left, and right edges of the front side as the "top, bottom, left and right sides" 240, 250, 220, 230 respectively.

Also before discussing the operation of insertion and extraction of the case into and out of the bracket, let us discuss mounting of the bracket to the mounting surface. See FIG. 4, which is a rear perspective view of the bracket 10 holding a CD case 190. For clarity, the mounting surface is not included in FIG. 4. For simplicity, in this document we will assume the mounting surface is a wall, while in actuality, the bracket is designed such that it can hold securely a CD case in any orientation, whether it be wall, ceiling, or any oblique planar orientation. Mounting is possible by using either double sided tape on the rigid base pieces 20, 30, or thumb tacks, as represented by parts 350 and 360, which are protruding through holes 370 and 380.

See FIG. 5. Key to the understanding of the operation of this bracket is the fact that planar 60 is offset a significant distance from the wall 400 by the significant thickness 40, 50 of each of the rigid base pieces 20, 30. Said significant thickness is covered as part of the attached claim. It is said significant thickness, 40, 50 by which the flexible cantilever portion 90 of the planar 60 may deflect and arm 170 subsequently translate toward the wall during both insertion and extraction of the case 190 into and from the bracket 10.

See FIG. 1. The bracket 10 is designed for ease of CD Case 190 insertion as well as ease of CD case extraction. The following four sentences will describe in general the sequence of events when inserting CD case into and extracting the CD case from the bracket. To insert the CD Case 190 into the bracket 10, the user simply pushes the CD case against arm 170, in the direction of Vector A, and then rotates slightly the CD case in the direction of Arrow B until edge 320 passes edge 170*a*, and the flexible cantilever 90 elastically snaps back into resting position as shown in FIG. 3. See FIG. 2. To extract the CD case from the bracket, the user simply pushes arm 170 towards the mounting surface, in the direction of Vector A. By pushing arm 170 toward the mounting surface, edge 170*a* passes edge 320 and the CD case is released from the bracket.

More specifically, to insert the case into the bracket, the user holds the CD case 190 with one hand, for example, the right hand, with the cover art facing the user. See FIG. 1. Although the user may hold the case however he/she pleases, for this discussion we will assume the user holds the case with the fingers of the right hand placed along top side 240 of the case while the thumb is on the bottom side 250 of the case.

First, the user holds the CD case close to the bracket, as shown in FIG. 1, which shows the top, bottom, left, and right sides 240, 250, 220, 230 of the case are generally aligned with the inside surfaces of arms 170, 180, 130, 140. As indicated by FIG. 1 Angle C, the user holds the case at an angular orientation slightly counter clockwise with respect to the orientation of said inside surfaces so that the top and bottom sides 240, 250 do not interfere with rigid tabs 150, 160, as shown in FIG. 1.

Please note that with respect to the direction perpendicular to the wall, in the direction of Vector A, edge 320 of the CD case does interfere with arm 170, as shown by circle D. Noting this interference is key in understanding the innovative design and function of arm 170 and the flexible portion 90, and the cutout (part 70, FIGS. 1, 2, 3) of the bracket 10.

The second step is, (See FIG. 1), the user pushes the case 190 toward the wall, in the direction of Vector A. See Circle D, FIG. 1. Subsequently, the rear edge 320 of the case is pushed against arm 170 in the direction of Vector A. This causes arm 170, which, as noted in the above paragraph, is attached to the flexible cantilever 90 of the bracket 10, to elastically move in the direction of Vector A as the flexible cantilever 90 bends toward the wall. FIG. 1 actually shows the orientation of the CD case 190 with respect to the bracket 10 immediately after executing said second step of the current paragraph. In FIG. 1 the flexible cantilever 90 has already been pushed in the direction of Vector A, toward the wall/mounting surface.

See FIG. 5, which is a view of the object of FIG. 2 with perspective perpendicular to arm 140 of FIG. 2. In FIG. 5, Note the height 80 of arm 170 is significantly less than the thickness 40, 50 of the rigid base pieces 20, 30. Noting the fact in the previous sentence is key in understanding the innovative design and function of arm 170, the flexible cantilever 90, and the cutout (part 70, FIGS. 1, 2, 3) of the bracket 10.

Thirdly, (See FIG. 1) the user continues to push the case 190 against arm 170 of the bracket 10, toward the mounting surface, until the rear side 210 of the case 190 is flush with the planar 60 of the bracket 10.

Fourthly, (See FIG. 2), the user rotates the case clockwise, in the direction of Arrow B until (See Circle D, FIG. 2) edge 320 passes the inner edge 170*a* of arm 170. The resulting relative position between the case 190 and bracket 10 is illustrated by FIG. 2 and FIG. 5. For simplicity and clarity, in FIG. 5, the cantilever 90 is shown to be excessively deflected toward the wall 400. At this point, there is no longer any interference between arm 170 and edge 320 and rear side 210 of the case 190. Subsequently, (FIG. 2) the arm 170 and flexible cantilever 90 of the planar 60 elastically return to resting position, and the case is held securely in place as shown in FIG. 3. Meanwhile, during the clockwise rotation, the holes 260, 270 of the case 190 are positioned over and past the outer extremities of tabs 150 and 160.

The case's movement (See FIG. 3) parallel to the mounting surface is limited laterally, vertically, and angularly by the inside surfaces of arms, 130, 140, 170, and 180. The case's movement perpendicular to the mounting surface is limited by the front surface of the planar 60 and tabs 150, 160, which now hold the CD case 190 by the edges of holes 260, 270, and the front facing surfaces 260*a*, 270*a*, as shown in zoomed views FIG. 2A and FIG. 2B. Note that in FIG. 2B, the interior surface 160*a* of the tab 160 (i.e. the surface of the tab which holds the edge of hole 270 and front facing surface 270*a* of the case) is not sloped.

From the text of the above paragraphs describing the four major steps in inserting the case into engagement into the bracket, one might perceive insertion to be complicated, but in reality, insertion is very simple. As witnessed during prototype testing, insertion is perceived to be accomplished simply by simultaneously pushing and twisting the CD case into engagement. See FIG. 1. On the prototype, the arm 170 was reworked to have a chamfered inner edge 170*a*, which made insertion even more simple, perceived to be simply pushing the case into insertion. The chamfered edge is mentioned in this and the previous sentence but was not included in the figures to avoid complicating the text and figures of the current specification.

Extraction (See FIG. 3) of the CD case 190 from the bracket 10 is accomplished simply by pushing arm 170 toward the mounting surface, in the direction of Vector A. Arm 170 has no tabs or protrusions interfering with any part of the CD case and therefore moves freely toward the mounting surface until edge 170*a* of arm 170 passes edge 320, as shown in FIG. 5. At this point, (See FIG. 1) the case may be rotated counter clockwise, opposite of Arrow B, until the outer extremities of tabs 150, 160 no longer interfere with the edges surrounding holes 260, 270. Consequentially the case is no longer held by the bracket and the user may take the case from the bracket.

From the text in the previous paragraph one may perceive extraction to be complicated, but in reality extraction is very simple. See FIG. 1. The center of gravity of the case is at almost the center of the case, and is substantially and significantly to the left of arm 140. As seen in prototype testing, pushing arm 170 simply causes the case to fall into the user's hand.

This flexure design 90 and application of the arm 170 is especially elegant because CD case extraction requires no forces pulling the bracket 10 away from the mounting surface 400, FIG. 5, therefore eliminating any risk of inadvertently separating the bracket 10 from the mounting surface 400, or damaging either the bracket 10 or the mounting surface 400 during CD Case extraction. Furthermore, since arm 170 has no tabs or protrusions, it makes for an elegant method of holding the CD case 190 securely in the bracket 10 without inflicting any clamping forces onto the case, therefore eliminating risk of damaging the case 190, or the bracket 10 during insertion or extraction.

Figure 4:
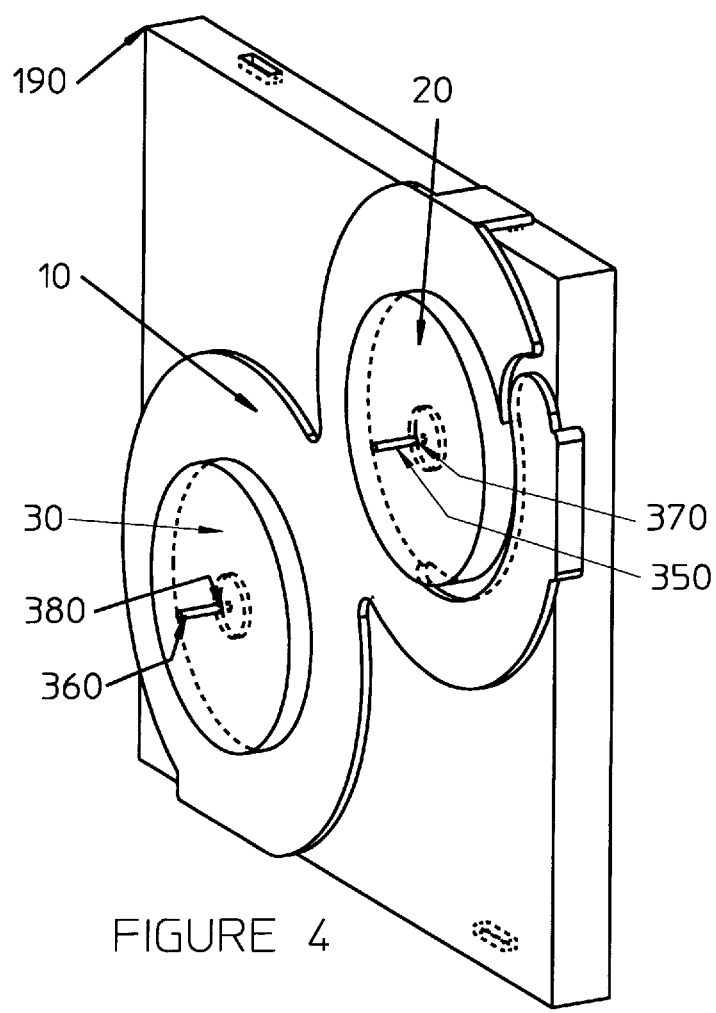
FIG. 4 is a perspective view as viewed from the mounting surface, showing means for attaching the bracket to the mounting surface.
Figure 5:
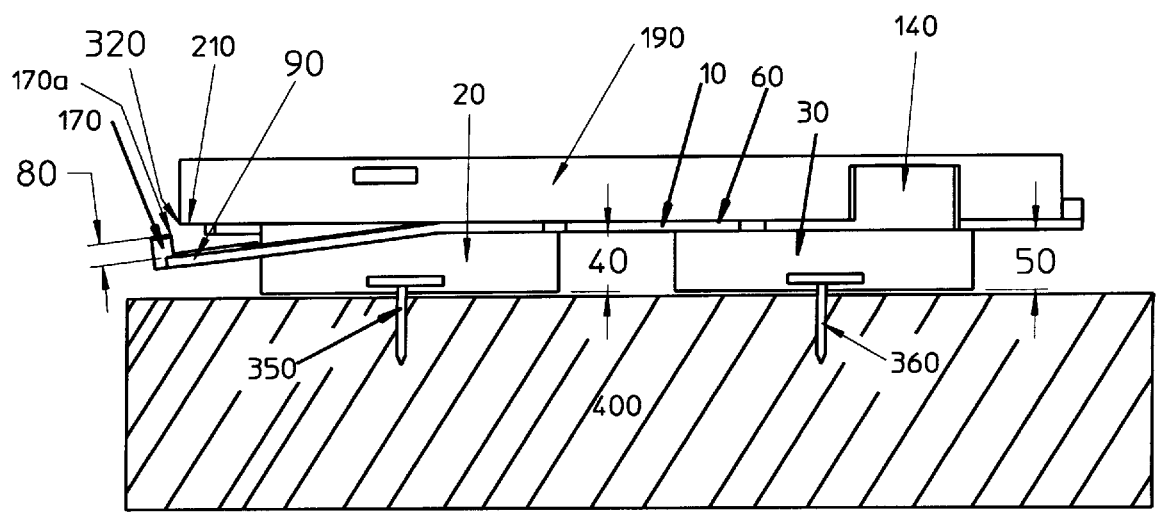
FIG. 5 is a bottom view of the bracket, showing the interaction of the arm and the case during both case engagement and disengagement.

FIG. 4 shows the bracket with CD Case fully engaged as viewed from the mounting surface. The bracket may be secured to the mounting surface via either double sided adhesive, or via thumb tacks as shown by 350, 360, which would be accommodated by the through holes shown 370, 380.

CONCLUSION, RAMIFICATIONS, AND SCOPE

The invention is intended for use by any person or company interested in displaying and/or storing compact disk cases in a manner displaying the case's cover art or information. Computer software CD ROM's, musical CD's, DVD's, CD ROM video games, and Karaoke (TM) CD's, are all examples of Compact disks stored in cases applicable to this invention.

By using multiple brackets, multiple cases may be showcased on a planar surface such as a wall or ceiling, in any pattern the user wishes to arrange the cases. For example, users may wish to mount and display their favorite or top ten CD's onto their bedroom wall in a top ten pyramid, checkerboard, wave, circular, or a random pattern.

With the growing popularity of notebook style CD holders, several CD owners merely discard of their empty CD Jewel Cases. This invention allows its users to make use of their empty CD cases as decoration for their walls and/or ceilings and other fixtures. For example, by using several of these brackets, users may cover entire or portions of walls/ceilings in their bedroom, family room, and/or entertainment room, creating the appearance of walls and/or ceilings tiled with CD cases.

Multi-media, music, software, Karaoke (TM), and/or DVD store owners may use this bracket for displaying CD's, DVD's, CD-Graphics, software CD-ROM's, video games, photo CD's and/or any CD product which may be packaged in a Jewel Case. Using this bracket would eliminate the need for bulky display/storage racks in the customer shopping area, as the CD cases (empty or full) may simply be mounted directly onto a wall or space efficient display stand. Since the bracket is designed to make it easy to replace the case clamped within, it lends itself well to the store owner's potential need to frequently replace or re-arrange the cases. Store inventory could then be kept in the back of the store or nearby the cash register, where more organized, space-efficient, theft proof storage methods may be implemented.

Although the description above contains many specifities, these should not be construed as limiting the scope of the invention but as merely providing illustrations of some of the presently preferred embodiments of this invention. Several variations of the current invention could be provided which would still be covered by the claim of this patent.

One embodiment of the current invention could be a bracket or rack that implements an elastic mechanism as described above and has additional said arms and tabs and/or lips to support multiple CD cases onto a planar surface for display.

Other embodiments of the current invention could be the bracket as described above, made of various materials such as plastic, wood, or metal. The shape of the current invention could be changed to create a different, aesthetically pleasing shape. The combination of said flexible portion and said cutout could be replaced by a different type of elastic supporting means and means for pushing, such as a spring-loaded button for depressing.

Another embodiment of the current invention could allow opening of the case while the case is mounted on the wall, while still providing a means for easy case extraction from the bracket. The positions of the arms of the preferred embodiment would merely have to be swapped. The swapping would be such that the two arms with tabs hold edges on the left and right side of the case and such that the arms with no tabs hold the top and bottom sides of the case. The cutout of the preferred embodiment would then merely be positioned so that it provides elastic support for one of the arms with no tabs. In this example, when the arm with no tabs, supported by the elastic supporting means, is pushed toward the mounting surface, case extraction and engagement is still as easy as pushing lightly on a button.

Thus the scope of the invention should be determined by the appended claims and their legal equivalencies, rather than by the examples given.

While a particular form of the invention has been illustrated and described, it will be apparent that various modifications can be made without departing from the spirit and scope of the invention. Accordingly, it is not intended that the invention be limited, except as by the appended claim.

I claim:

1. A device for storing and displaying at least one digitally recorded disk case on any horizontal, vertical, or sloped flat mounting surface, said device comprising:
   A.) A modular unit comprising
      i.) a rigid base element which has a planar rear side and a planar front side, said front side and said rear side being parallel to each other and offset from each other by a predetermined distance,
      ii.) a top portion which is defined by at least one or upper arm,
      iii.) a first protrusion, which extends perpendicularly and descends from said upper arm, said first protrusion having a rear side which faces the front side of the base element for securing the case there between,
      iv.) a bottom portion which is defined by at least one lower arm,
      v.) a second protrusion, which extends perpendicularly and ascends from said lower arm, said second protrusion having a rear side which faces the front side of the base element for securing the case there between,
      vi.) a side portion which is defined by a first side dog,
      vii.) a means for mounting said device against the mounting surface means for spacing the rigid base from the mounting surface comprising at least one integrally formed rigid base piece extending rearwardly of said planar rear side to space the rigid base from the mounting surface said upper arm being attached to said front side of the base element so that the upper arm extends perpendicularly away from the front side of the base element, said lower arm being attached to said front side of the base element so that the lower arm extends perpendicularly away from the front side of the base element,
   B.) a means formed integral with said rigid base element, for allowing the case to be held securely against the modular unit as well as for releasing the case from the device, said means comprising a curved slot in said rigid base forming a flexible cantilever arm with a push button at a free end thereof, said push button having a flat inner face functioning as a second side dog on an opposing side portion of said rigid base opposite to said first dog and adapted to serve as an obstructive stop to secure the case within the modular unit, said button being displaceable rearwardly of said planar front side to allow insertion and removal of the case from the modular unit.

* * * * *

UNITED STATES PATENT AND TRADEMARK OFFICE
CERTIFICATE OF CORRECTION

PATENT NO. : 6,196,510 B1
DATED : March 6, 2001
INVENTOR(S) : Ferdinand Legaspi

It is certified that error appears in the above-identified patent and that said Letters Patent is hereby corrected as shown below:

<u>Title page,</u>
Item [76] Inventor, Ferdinand <u>Santos</u> Legaspi

<u>Column 10,</u>
Lines 21-65,
1. A device for storing and displaying at least one digitally recorded disk case on any horizontal, vertical, or sloped flat mounting surface, said device comprising:

A.) A modular unit comprising i). a rigid base element which has a planar rear side and a planar front side, said front side and said rear side being parallel to each other and offset from each other by a predetermined distance, ii.) a top portion which is defined by at least one upper arm, iii.) a first protrusion, which extends perpendicularly and descends from said upper arm, said first protrusion having a rear side which faces the front side of the base element for securing the case there between, iv.) a bottom portion which is defined by at least one lower arm, v.) a second protrusion, which extends perpendicularly and ascends from said lower arm, said second protrusion having a rear side which faces the front side of the base element for securing the case there between, vi.) a side portion which is defined by a first side dog, vii.) a means for mounting said device against the mounting surface <u>as well as</u> for spacing the rigid base from the mounting surface comprising at least one integrally formed rigid base piece extending rearwardly of said planar rear side to space the rigid base from the mounting surface, said upper arm being attached to said front side of the base element so that the upper arm extends perpendicularly away from the front side of the base element, said lower arm being attached to said front side of the base element so that the lower arm extends perpendicularly away from the front side of the base element,

UNITED STATES PATENT AND TRADEMARK OFFICE
CERTIFICATE OF CORRECTION

PATENT NO. : 6,196,510 B1
DATED : March 6, 2001
INVENTOR(S) : Ferdinand Legaspi

It is certified that error appears in the above-identified patent and that said Letters Patent is hereby corrected as shown below:

B.) a means formed integral with said rigid base element, for allowing the case to be held securely against the modular unit as well as for releasing the case from the device, said means comprising a curved slot in said rigid base forming a flexible cantilever arm with a push button at a free end thereof, said push button having a flat inner face functioning as a second side dog on an opposing side portion of said rigid base opposite to said first dog and adapted to serve as an obstructive stop to secure the case within the modular unit, said button being displaceable rearwardly of said planar front side to allow insertion and removal of the case from the modular unit.

Signed and Sealed this

Ninth Day of April, 2002

Attest:

Attesting Officer

JAMES E. ROGAN
Director of the United States Patent and Trademark Office